United States Patent
Wang et al.

(10) Patent No.: US 6,359,064 B1
(45) Date of Patent: Mar. 19, 2002

(54) COMPOUND OF POLYESTER AND POLYALKYLENE GRAFTED COMB POLYMER

(75) Inventors: Xiaorong Wang, Hudson; James E. Hall, Mogadore, both of OH (US)

(73) Assignee: Bridgestone Corporation, Chuo-ku ( * ) Notice: Subject to any disclaimer, the term of this patent is extended or adjusted under 35 U.S.C. 154(b) by 0 days.

(21) Appl. No.: 09/658,125

(22) Filed: Sep. 8, 2000

(51) Int. Cl.[7] .............................. C08G 63/48; C08J 3/00
(52) U.S. Cl. ............................ 525/66; 525/63; 525/64; 525/165; 525/168; 525/178; 525/445; 524/81; 524/286; 524/297; 524/534
(58) Field of Search ............................ 525/63, 64, 66, 525/165, 168, 178, 445; 524/81, 286, 534, 297

(56) References Cited

U.S. PATENT DOCUMENTS

| | | |
|---|---|---|
| 2,725,367 A | 11/1955 | Niederhauser et al. |
| 2,971,934 A | 2/1961 | Brown et al. |
| 3,244,664 A | 4/1966 | Zelinski et al. |
| 3,281,383 A | 10/1966 | Zelinski et al. |
| 3,297,654 A | 1/1967 | Barr et al. |
| 3,414,551 A | 12/1968 | Reid et al. |
| 3,428,596 A | 2/1969 | Strand et al. |
| 3,480,580 A | 11/1969 | Joyner et al. |
| 3,481,910 A | 12/1969 | Brunson et al. |
| 3,492,227 A | 1/1970 | Kolaian |
| 3,528,936 A | 9/1970 | Kent et al. |
| 3,577,365 A | 5/1971 | Folzenlogen et al. |
| 3,594,452 A | 7/1971 | De La Marre et al. |
| 3,751,378 A | 8/1973 | Cowperthwaite et al. |
| 3,761,458 A | 9/1973 | Holler et al. |
| 3,796,687 A | 3/1974 | Collette et al. |
| 3,840,449 A | 10/1974 | Furukawa et al. |
| 3,862,265 A | 1/1975 | Steinkamp et al. |
| 3,970,608 A | 7/1976 | Furukawa et al. |
| 3,985,830 A | 10/1976 | Fetters et al. |
| 3,998,907 A | 12/1976 | Di Giulio |
| 4,015,612 A | 4/1977 | Pavlik et al. |
| 4,017,669 A | 4/1977 | Collette et al. |
| 4,087,485 A | 5/1978 | Huff |
| 4,104,332 A | 8/1978 | Zelinski |
| 4,132,531 A | 1/1979 | Cummings et al. |
| 4,139,417 A | 2/1979 | Marie et al. |
| 4,151,336 A | 4/1979 | Sackmann et al. |
| 4,151,337 A | 4/1979 | Kanoh et al. |
| 4,287,314 A | 9/1981 | Fava |
| 4,304,886 A | 12/1981 | Bean et al. |
| 4,374,951 A | 2/1983 | Lee et al. |
| 4,404,321 A | 9/1983 | Abolins et al. |
| 4,404,322 A | 9/1983 | Saito et al. |
| 4,408,010 A | 10/1983 | Le-Khac |
| 4,423,196 A | 12/1983 | Arlt et al. |
| 4,427,828 A | 1/1984 | Hergenrother et al. |
| 4,502,229 A | 3/1985 | Kitzman |
| 4,506,056 A | 3/1985 | Gaylord |
| 4,540,753 A | 9/1985 | Cozewith et al. |
| 4,585,824 A | 4/1986 | Uchida et al. |
| 4,605,700 A | 8/1986 | Le-Khac |
| 4,683,275 A | 7/1987 | Kato et al. |
| 4,728,463 A | 3/1988 | Sutker et al. |
| 4,732,928 A | 3/1988 | Mizushiro et al. |
| 4,735,992 A | 4/1988 | Nogues |
| 4,771,097 A | 9/1988 | Sackmann et al. |
| 4,772,657 A | 9/1988 | Akiyama et al. |
| 4,889,896 A | 12/1989 | Canova et al. |
| 4,893,055 A | 1/1990 | Fuzzi et al. |
| 4,912,141 A | 3/1990 | McCready |
| 4,921,910 A | 5/1990 | Lunt et al. |
| 4,931,502 A | 6/1990 | McCready |
| 4,996,262 A | 2/1991 | Pyke et al. |
| 5,008,324 A | 4/1991 | Killgoar, Jr. et al. |
| 5,034,449 A | 7/1991 | Mallikarjun |
| 5,037,924 A | 8/1991 | Tazi et al. |
| 5,082,913 A | 1/1992 | Tazi et al. |
| 5,122,161 A | 6/1992 | Benfaremo et al. |
| 5,126,403 A | 6/1992 | Graiver et al. |
| 5,156,920 A | 10/1992 | Aycock et al. |
| 5,202,384 A | 4/1993 | Pyke et al. |
| 5,212,227 A | 5/1993 | Sakazume et al. |
| 5,219,628 A | 6/1993 | Hathaway et al. |
| 5,225,498 A | 7/1993 | Sorathia et al. |
| 5,244,971 A | 9/1993 | Jean-Marc |
| 5,300,569 A | 4/1994 | Drake et al. |
| 5,318,854 A | 6/1994 | Hamersma et al. |
| 5,356,953 A | 10/1994 | Harada et al. |
| 5,373,048 A | 12/1994 | Witzeman et al. |
| 5,414,044 A | 5/1995 | Moriya et al. |
| 5,432,662 A | 7/1995 | Kato et al. |
| 5,472,741 A | 12/1995 | Sackmann et al. |

(List continued on next page.)

FOREIGN PATENT DOCUMENTS

| AU | B-47913/85 | 4/1986 |
|---|---|---|

(List continued on next page.)

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

(List continued on next page.)

*Primary Examiner*—Samuel A. Acquah
(74) *Attorney, Agent, or Firm*—David G. Burleson; Arthur M. Reginelli

(57) ABSTRACT

A process for forming an elastomeric polymer gel composition includes forming a blend by combining a poly(alkenyl-co-maleimide) that includes a maleimide and at least one monomer contributed unit derived from vinyl aromatic hydrocarbons, $R^1R^2$ ethylenes, and alkyl vinyl ethers; with a maleated polyalkylene. This is followed by addition of a crosslinking agent, which is allowed to react with the poly(alkenyl-co-maleimide) and maleated polyalkylene to form a polyalkyenyl grafted poly(alkenyl-co-maleimide). The polyalkenyl grafted poly(alkenyl-co-maleimide) is further blended with a polyester.

20 Claims, No Drawings

U.S. PATENT DOCUMENTS

| | | |
|---|---|---|
| 5,489,657 A | 2/1996 | Sue et al. |
| 5,494,964 A | 2/1996 | Meichsner et al. |
| 5,494,981 A | 2/1996 | Gorodisher et al. |
| 5,508,334 A | 4/1996 | Chen |
| 5,532,317 A | 7/1996 | Shinmura et al. |
| 5,536,774 A | 7/1996 | Segatta |
| 5,548,031 A | 8/1996 | Doi |
| 5,585,434 A | 12/1996 | DeNicola, Jr. et al. |
| 5,585,436 A | 12/1996 | Niessner et al. |
| 5,602,200 A | 2/1997 | Wissmann |
| 5,618,881 A | 4/1997 | Hojabr |
| 5,634,122 A | 5/1997 | Loucks et al. |
| 5,637,410 A | 6/1997 | Bonner et al. |
| 5,651,927 A | 7/1997 | Auda et al. |
| 5,652,307 A | 7/1997 | Niessner et al. |
| 5,654,364 A | 8/1997 | Bates et al. |
| 5,655,820 A | 8/1997 | Kervagoret |
| 5,658,985 A | 8/1997 | Eichenauer et al. |
| 5,665,820 A | 9/1997 | Liestner et al. |
| 5,670,006 A | 9/1997 | Wilfong et al. |
| 5,684,122 A | 11/1997 | Inoue et al. |
| 5,691,411 A | 11/1997 | Khouri et al. |
| 5,710,228 A | 1/1998 | Krause et al. |
| 5,776,234 A | 7/1998 | Schilling |
| 5,783,630 A | 7/1998 | Evans et al. |
| 5,798,413 A | 8/1998 | Spelthann et al. |
| 5,798,414 A | 8/1998 | Mishima et al. |
| 5,821,032 A | 10/1998 | DoMinh |
| 5,869,695 A | 2/1999 | Ulmer et al. |
| 5,883,188 A | 3/1999 | Hwang et al. |
| 5,905,116 A | 5/1999 | Wang et al. |
| 5,912,296 A | 6/1999 | Wang et al. |
| 5,962,572 A | 10/1999 | Chen |
| 5,965,666 A | 10/1999 | Koo et al. |

FOREIGN PATENT DOCUMENTS

| | | |
|---|---|---|
| CA | 702610 | 1/1965 |
| DE | 3430802 A1 | 3/1986 |
| DE | 42 25 875 A1 | 2/1994 |
| DE | 42 39437 A1 | 5/1994 |
| DE | 42 41 538 A1 | 6/1994 |
| EP | 0 177 401 AI | 4/1986 |
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 922151 | 3/1963 |
| JP | 6-248017 | 9/1954 |
| JP | 60-243102 | 12/1985 |
| JP | 6-56921 | 3/1994 |
| JP | 8183885 A | 7/1996 |
| JP | 8-255901 | 10/1996 |
| JP | 9012834 A | 1/1997 |
| JP | 9012835 A | 1/1997 |
| WO | WO 96/23007 | 8/1996 |
| WO | WO 97/00898 | 1/1997 |

OTHER PUBLICATIONS

A. Matsumoto, Y. Oki, and T. Otsu, Polymer J., 23(3), 201 (1991). Sythesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo, Macromol. Rapid Commun., 17, 835(1996). Synthesis and Photocrosslinking of Maleimide–Type Polymers.

W. Lee, and G. Hwong, J. Appl. Polym. Sci., 59, 599 (1996). Polysulfobetaines and Corresponding Cationic Polymers. IV. Synthesis and Aqueous Solution Properties of Cationic Poly (MIQSDMAPM).

I. Vermeesch, and G. Groeninckx, J. Appl. Polym. Sci., 53, 1365(1994). Chemical Modification of Poly(styrene–comaleic anhydride) with Primary N–Alkylamines by Reactive Extrusion.

COMPOUND OF POLYESTER AND POLYALKYLENE GRAFTED COMB POLYMER

FIELD OF THE INVENTION

The present invention relates to the development of high damping polymers with superior high-temperature stability, mechanical strength, and moldability. The inventive composition is particularly useful as a soft molding material for various products. The inventive composition also has an improved hysteresis value while maintaining the other superior qualities of centipede gels due to the addition of a hyperbranched polyester to the polymer composition.

BACKGROUND OF THE INVENTION

The polymerization of isobutylene and maleic anhydride and the polymerization of styrene or methyl vinyl ether and maleic anhydride may be carried out by free radical initiation. Further, imidization between a maleic anhydride and primary amine groups is known.

Two or more polymers may be blended together to form a wide variety of random or structured morphologies to obtain products that offer potentially desirable combinations of characteristics. However, it may be difficult or even impossible in practice to achieve many potential combinations through simple blending. Frequently, the polymers are thermodynamically immiscible, which precludes generating a truly homogeneous product. While it is sometimes desirable to have a two-phase structure, the situation at the interface between these two phases very often leads to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is desirable to design a polymer composition which has high damping capabilities while avoiding the above-mentioned problems.

SUMMARY OF THE INVENTION

In one aspect, the present invention provides a process for forming an elastomeric polymer gel composition. The process includes combining a poly(alkenyl-co-maleimide) comprising a maleimide and at least one monomer contributed unit chosen from vinyl aromatic hydrocarbons, $R^1R^2$ethylenes, and alkyl vinyl ethers, with a maleated polyalkylene so as to form a blend. This is followed by addition of a crosslinking agent, which is allowed to react with the poly(alkenyl-co-maleimide) and maleated polyalkylene to form a polyalkenyl grafted poly(alkenyl-co-maleimide). The grafted poly(alkenyl-co-maleimide) is blended with a polyester.

In another aspect, the present invention provides an elastomeric composition. The elastomeric composition comprises a copolymer, including a maleimide and at least one monomer contributed unit chosen from the group consisting of vinyl aromatic hydrocarbons, $R^1R^2$ethylenes, and alkyl vinyl ethers, a maleated polyalkylene, a crosslinking agent, and a hyperbranched polyester.

The present invention provides a centipede polymer composition exhibiting improved properties such as hysteresis, tensile strength, maximum elongation, tear strength, damping properties, high temperature compression set, and the like. More particularly, the inventive grafted poly(alkenyl-co-maleimide) copolymers react with hyperbranched polyesters to improve the hysteresis values while maintaining the tensile strength, tear strength, damping properties, and high-temperature compression set of the centipede polymer.

The following definitions apply hereinthroughout unless a contrary intention is expressly indicated:

"Vinyl aromatic hydrocarbon" and "alkenyl benzene" are used interchangeably;

"Maleic anhydride" encompasses dicarboxylic acids, including maleic anhydride, which can form a copolymer with an alkenyl benzene, an $R^1R^2$ethylene, or an alkyl vinyl ether, the copolymer having dicarboxylic acid units which are capable of reaction with an amine functional group;

"Maleimide" encompasses the reaction product of an primary amine and the dicarboxylic acids described above;

"$R^1R^2$ethylene" as used herein encompasses monomers of the general formula:

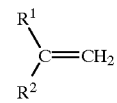

where $R^1$ and $R^2$ are the same or different substituents on the same or different carbon atoms of the ethylene group, and are independently H or substituted or unsubstituted $C_1$–$C_{20}$ alkyl groups;

Poly(alkenyl-co-maleimide) includes poly (alkenylbenzene-co-maleimide), poly($R^1R^2$ethylene-co-maleimide), and poly(alkyl vinyl ether-co-maleimide); and "Hyperbranched" means a highly branched polymer structure with a random morphology and high resistance to crystallization.

DETAILED DESCRIPTION OF THE ILLUSTRATIVE EMBODIMENTS

Preferably, the polymer compositions of the present invention include a backbone formed by copolymerization of a maleic anhydride with at least a second monomer, such as butadiene, styrene, or methyl vinyl ether. The maleic anhydride units are partially imidized with a primary amine, and the remainder are graft reacted to a maleated polyalkylene via a crosslinking agent such as a diamine. This composition is blended with a hyperbranched polyester to form an elastomeric polymer gel composition with superior damping properties.

The elastomeric polymer gel composition contains a poly(alkenyl-co-maleimide) having at least one maleated polyalkylene segment grafted thereto through at least one functional linkage formed by a cross-linking reaction with a grafting agent, at least one hyperbranched polyester additive, and, optionally, an extender.

The poly(alkenyl-co-maleimide) is a "centipede" polymer formed by imidizing a poly(alkenyl-co-maleic anhydride) with a primary amine. The centipede polymer has a high molecular weight spine connected with many relatively short side chains formed from the addition of the primary amines. The length of the main chain usually is as long or longer than the entanglement length, which is herein defined theoretically as an order of magnitude of 100 repeating units, while the length of the side chains is smaller than the entanglement length.

At least a portion of the maleic anhydride-contributed monomer units are not reacted with the primary amine, and thus remain available for coupling with a maleated polyalkylene via a crosslinking agent. These unreacted maleic anhydride-contributed monomer units preferably comprise from about 0.01 to about 5 weight percent of the copolymer.

Suitable alkenyl contributed monomer units include alkenyl benzene, $R^1R^2$ethylene, and alkyl vinyl ethers.

Preferred alkenyl benzene-contributed monomer units of the poly(alkenyl-co-maleimide) centipede are any one or combination of styrene, α-methylstyrene, p-methylstyrene, 4-phenylstyrene, m-methylstyrene, p-tert-butylstyrene, dimethylstyrene, as well as alkyl, cycloalkyl, aryl, alkaryl, and aralkyl derivatives thereof, in which the total number of carbon atoms in the combined hydrocarbon is generally not greater than 12, as well as any di- or tri-vinyl aromatic hydrocarbons. Particularly preferred vinyl aromatic hydrocarbons are styrene and/or α-methylstyrene.

The $R^1R^2$ethylene contributed monomer units of the centipede polymer contain 3 to about 40 carbon atoms wherein $R^1$ and $R^2$ are hydrogen or the same or different substituents on the same or different carbon atom of the ethylene group, selected from unsubstituted and substituted, linear and branched $C_1$–$C_{20}$ alkyl groups, the substituted groups being non-reactive with the remaining components of the centipede polymers, such as alkoxyalkyl groups having $C_1$–$C_{20}$ carbon atoms. Other acceptable substituents include —Cl, —OH, —COOH, and —CN.

The alkyl vinyl ether contributed monomer units are chosen such that the alkyl group contains about 1 to about 20 carbon atoms in the backbone and may be substituted or unsubstituted, linear or branched, along the backbone of the alkyl group. The substituted groups, such as $C_2$–$C_{20}$ alkoxyalkyl groups, are non-reactive with the remaining components of the centipede polymers.

Examples of unsubstituted and substituted alkyl groups $R^1$, $R^2$, from the $R^1R^2$ethylene contributed monomer units; and alkyl, from the alkyl vinyl ether contributed monomer units, are independently substituted or unsubstituted, linear or branched, alkyl groups containing 1 to about 20 carbons such as methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyidecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl, and the like.

Preferred alkenyl monomers for forming the poly (alkenyl-co-maleic anhydride) are styrene, methyl vinyl ether, and/or isobutylene.

For present purposes, poly(alkenyl-co-maleimide) and poly(alkenyl-co-maleic anhydride) encompass random and stereospecific copolymers, including copolymers having alternating alkenyl-contributed units (i.e., polymer blocks derived from an alkenyl benzene such as styrene) and maleimide- or maleic anhydride-contributed units (i.e., polymer blocks derived from a maleimide or maleic anhydride) along the polymer backbone. Such alternating structures typically are described as poly(alkenyl-alt-maleimide) and poly(alkenyl-alt-maleic anhydride); however, these specific polymers are encompassed within the general terms poly (alkenyl-co-maleimide) and poly(alkenyl-co-maleic anhydride).

The poly(alkenyl-co-maleimides) are subsequently graft-reacted through a difunctional linking or grafting agent to a maleated polyalkylene to yield a maleated polymer having at least one polyalkylene segment grafted thereto through the at least one functional linkage thus formed. The alkylene moiety of the polalkylene may be derived from ethylene and/or propylene. A preferred polyalkylene is polypropylene.

The maleated polypropylene may be any of the conventional polypropylene compounds that are subsequently maleated by known methods. The polypropylene grafted segment(s) have weight average molecular weights ($M_w$) of about 10,000 up to about 10,000,000 or higher, preferably about 20,000 to about 300,000.

The crystallinity, or tacticity, of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. Although the polypropylene may be substantially free of ethylene, small amounts of ethylene, on the order of less than about 10% by weight, sometimes are incorporated. Furthermore, in certain instances, the polypropylene contains small amounts of ethylene in copolymers known as "reactor copolymers." Thus, the grafted polypropylenes can contain minor amounts of ethylene, both as part of the ethylene-propylene segments and as polyethylene segments.

Polymerization conditions for the preparation of polypropylene are known in the art. Propylene can be polymerized to form isotactic polypropylene in the presence of stereospecific Ziegler-Natta catalyst systems including a transition metal compound and an organometallic compound. Suitable compounds of transition metals are those of Groups 4 to 6 and 8 of the Periodic Table of elements, preferably titanium compounds, most preferably, titanium halides. Suitable organometallic compounds are those of elements of Groups 1 to 3 of the Periodic Table, especially aluminum alkyls and aluminum alkyl halides. Illustrative examples include $TiCl_3$ and $TiCl_4$ as catalysts and triethylaluminum chloride and diethyl aluminum as cocatalysts. These transition metal catalyst systems can be non-supported or supported on, for example, silica gel, metal oxides and dihalides, such and MgO, $MgCl_2$, $ZnCl_2$, and the like. Such systems can be reacted together and can be complexed with a variety of Lewis-base electron donors.

Molecular weight control can be achieved by incorporating $H_2$ via a feed stream into the polymerization reactor. Hydrogen is added at about 0 to 30 mole % based on total monomer. The polymerization reaction is preferably conducted according to the slurry method employing an inert hydrocarbon diluent or liquid propylene as the vehicle. The polymerization temperature can be in the range of about 50° to about 100° C. and is preferably in a range of about 60° to about 80° C. Polymerization pressure is not critical and can vary widely, for example, in the range from between atmospheric pressure to 3.7 MPa. For a general review of the art, see "Olefin Polymers (Polypropylene)" in the Kirk-Othmer Encyclopedia of Chemical Technology, $3^{rd}$ ed., vol. 16, pp. 453–69 (J. Wiley & Sons, 1981).

Maleation of the polypropylene compound to maleated polypropylene is conveniently accomplished by heating a blend of polypropylene and ethylenically unsaturated carboxyl group-containing compounds, e.g., maleic anhydride, within a range of about 150° to about 400° C., often in the presence of free-radical initiators, such as organic peroxides. Methods of preparing these grafted polymers are known in the art as illustrated, for example, in U.S. Pat. Nos. 3,480,580; 3,481,910; 3,577,365; 4,506,056; and 3,414,551, the teachings of which are incorporated herein by reference. An independent source of the description of the process can be found in Minoura, et al., *J. Applied Polymer Sci.* 1625 (1969). The use of heat and/or physical shearing optionally with the free-radical initiators, in such equipment as extruders, masticators, and the like, to accomplish simultaneously a controlled degradation in molecular weight of the polypropylene along with the free-radical grafting of the maleic anhydride can be useful in accordance with this invention.

Maleation preferably is conducted with such amounts of maleic anhydride and free-radical initiators and under conditions of temperature and shearing such that free-radical sites on the polypropylene are formed substantially at the time of scission of the polypropylene chains and at the point of such scission. Maleic anhydride is then grafted onto the scissioned end of one side of such broken chains. In this manner, the anhydride groups are located principally at the ends of the maleated polypropylene chains, and the substantial majority of such maleated polypropylene chains contain one site of maleation. This procedure permits grafting of the maleated polypropylene at its maleated end to the poly (alkylene-co-maleimide) through use of a difunctional linking or grafting agent having two functional groups, each functional group being reactive with a maleate group on the polypropylene and with a maleate group on the poly (alkylene-co-maleimide). Multiple sites of maleation can lead to grafting of the maleated polypropylene to more than one maleated centipede polymer or at more than one site of one or more maleated centipede polymers.

Free-radical initiators preferably are used in an amount of from about 0.01 to 1.0 wt %, preferably, from about 0.02 to 0.5 wt % and most preferably, from about 0.04 to 0.3 wt % of the total polypropylene and solvent (if used). Preferably, they are the first component added to the polymerization reaction. The mixture is heated to a temperature at or about the known decomposition temperature of the selected free-radical initiator, concurrently with any optional mechanical shearing. Maleic anhydride is subsequently added in an amount of from about 0.01 to 10 wt %, preferably, from about 0.1 to 5 wt %, and most preferably, about 0.75 to 2 wt % of the total polypropylene.

The maleated polyalkylene contains (based upon the weight of the maleated polyalkylene) from about 0.01 wt % incorporated maleic anhydride, to about 5 wt %. Preferably, the maleic anhydride content is from about 0.01 to about 2 wt %, most preferably about 0.03 to about 0.2 wt %. Unreacted polyalkylene also is present in the reaction mix as are minor amounts of reaction by-products, such as decomposed free-radical products. These by-products are substantially removed by known methods, e.g., sparging with $N_2$ or washing with water. Maleic anhydride may not be left in substantial amounts in the polymer without detrimental effects on the subsequent reaction of the poly(alkenyl-co-maleimide) with the maleated polyalkylene.

The poly(alkenyl-co-maleic anhydride) preferably contains from about 5 to 99 mole percent of maleic anhydride with the remainder being alkenyl monomer contributed units. Poly(alkenyl-co-maleic anhydride) preferably contains from 20 to 60 mole percent maleic anhydride contributed units, most preferably 40–60 mole percent maleic anhydride contributed units, and 40–60 mole percent alkenyl monomer contributed units. The comonomers can be randomly or alternately distributed in the chain, although an alternating distribution along the polymer backbone chain is preferred for many applications.

The poly(alkenyl -maleimide) may be formed by reacting a poly(alkenyl-co-maleic anhydride) in the presence of a primary amine at a temperature from about 100 to about 300° C. and at a pressure from about slightly above vacuum to about 3.7 MPa, under substantially dry conditions. The reactants are preferably dry mixed in the absence of solvents in a suitable mixing apparatus, such as a Brabender mixer. Purging the mixer with an inert gas, such as $N_2$ or Ar prior to the charging of the reactants can be preferred. The primary amine may be added in a singular charge or in sequential partial charges into the reactor containing a charge of poly(alkenyl-co-maleic anhydride). Preferably the primary amine is charged in ratio between about 0.7 to about 1.0 moles of amine per monomer contributed units of maleic anhydride in the poly(alkenyl-co-maleic) anhydride, more preferably in ratio between about 0.8 to about 1.0 moles of amine per monomer contributed units of maleic anhydride in the poly(alkenyl-co-maleic anhydride).

Suitable primary amines include, but are not limited to, alkyl amines, alkyl benzyl amines, alkyl phenyl amines, alkoxybenzyl amines, alkyl aminobenzoates, alkoxy aniline, and other linear primary amines containing from about 1 to about 50 carbon atoms, preferably about 6 to about 30 carbon atoms in the alkyl and alkoxy substituents in these primary amines. The alkyl and alkoxy substituents on the above discussed primary amines can be linear or branched, preferably linear, and saturated or unsaturated, preferably saturated. Exemplary amines include hexylamine, octylamine, dodecylamine, and the like.

The poly(alkenyl-co-maleimide), prior to grafting with maleated polyalkylene, preferably has a weight average molecular weight ($M_w$) of between about 10,000 and 500,000 and even more preferably between about 150,000 and 450,000.

The centipede polymer may be prepared by conventional means for combining such ingredients, such as blending, milling, or internal batch mixing. A rapid and convenient method of preparation includes heating a mixture of the components to a temperature of about 50–290° C.

The centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed-type Brabender mixer, extruding machine, kneader, continuous mixer, etc., is acceptable. The closed-type Brabender mixer is preferable, and mixing in an inactive gas environment, such as $N_2$ or Ar, is also preferable.

Grafting of maleated polyalkylene and poly(alkenyl-co-maleimide) is preferably carried out by addition of a grafting agent containing two or more reactive functional groups. Acceptable functional groups include primary amine, secondary amine, carboxyl, formyl, hydroxyl, cyano, vinyl, alkynyl, etc. A preferred grafting agent is an organic diamine, which is added to a blend of maleated polyalkylene and poly(alkenyl-co-maleimide) to partially cross-link the polyalkylene to the poly(alkenyl-co-maleimide) through the unreacted maleate functional groups.

Organic diamines or diamine mixtures containing two aliphatically or cycloaliphatically bound primary amino groups are preferably used as grafting agents for the process. Such diamines include, for example, aliphatic or cycloaliphatic diamines corresponding to the following formula $R^3(NH_2)_2$ wherein $R^3$ represents a $C_2$–$C_{20}$ aliphatic hydrocarbon, a $C_4$–$C_{20}$ cycloaliphatic hydrocarbon group, a $C_6$–$C_{20}$ aromatic hydrocarbon group, or a $C_4$–$C_{20}$ N-heterocyclic ring. Exemplary diamines include ethylenediamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethylcyclohexylamine; 1,2-bis-(amino-ethyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-aminocyclohexyl)-propane; 3,3'-dimethyl-4,4'-diaminodicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline; 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline; 4,4'-methylenedianiline; aniline-formaldehyde resin; trimethylene glycol di-p-aminobenzoate; bis-(2-aminoethyl)-amine, bis-(3-aminopropyl-amine, bis-(4-aminobutyl)-amine; bis-(6-aminohexyl)-amine, and isomeric mixtures of dipropylene triamine and dibutylene triamine. Mixtures of these diamines may also be used.

Other suitable polyamines for use as grafting agents include bis-(aminoalkyl)-amines, preferably those having a total of from 4 to 12 carbon atoms, such as bis-(2-aminoethyl) amine, bis-(3-aminopropyl) amine, bis-(4-aminobutyl) amine, and bis-(6-aminohexyl) amine, and isomeric mixtures of dipropylene triamine and dibutylene triamine. Hexamethyl diamine, tetramethylene diamine, and especially 1,12-diaminododecane are preferably used.

The grafted polymer composition preferably has added thereto one or more extenders such as extender oils and low molecular weight compounds or components. Suitable extender oils include naphthenic, aromatic and paraffinic petroleum oils and silicone oils. Examples of low molecular weight organic compounds or components useful as extenders in the compositions of the present invention are low molecular weight organic materials having a number average molecular weight ($M_n$) of less than 20,000, preferably less than 10,000, and most preferably less than 5,000. Although there is no particular limitation to the material that may be employed, the following is a list of exemplary appropriate materials:

1) softening agents, namely aromatic naphthenic and paraffinic softening agents for rubbers or resins;
2) plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether, and polyester plasticizers for NBR;
3) tackifiers, namely coumarone resins, coumarone-indene resins, terpene phenol resins, petroleum hydrocarbons, and rosin derivative;
4) oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, SBR, butadiene-acrylonitrile rubber, polychloroprene, etc.), silicone oligomers, and poly(α-olefins);
5) lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and,
6) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low molecular weight organic materials include latices, emulsions, liquid crystals, bituminous compositions, polymers, and phosphazenes. One or more of these materials may be used as extenders. A preferred extender is di(tridecyl)phthalate (DTDP oil) from the C. P. Hall Co., (Chicago, Ill.). Extender(s) are added to the polymer composition in the range of about 10 wt % to about 90 wt %, preferably about 15 wt % to about 75 wt %, and most preferably about 20 wt % to about 60 wt %.

After the extended, polyalkylene grafted poly(alkenyl-co-maleimide) is formed, it can be further mixed with a hyperbranched polyester to improve the damping properties of the polymer gel composition. The hyperbranched polyester is formed by reacting at least one carboxylic acid, at least one alcohol, and at least one anhydride with each other, followed by the addition of at least one additional anhydride to form a polyester prepolymer. This polyester prepolymer is cured via a crosslinking agent such as that described above to form the hyperbranch characteristics of the polymer. The resultant hyperbranched polyester is added to the maleated polypropylene grafted centipede polymer in amounts between about 1 wt % to about 50 wt %, preferably between about 10 wt % and 40 wt %, most preferably between about 15 wt % and 45 wt %. The resulting gel has a high temperature compression set at 100° C. of less that about 60%, and hysteresis values (tan δ) at 23° C. greater than about 0.5, more preferably greater than about 0.8.

Suitable hyperbranched polyesters for use in the present invention are compact molecules with many branches which carry a high number of terminal functional groups on each molecule. These highly branched, three dimensional molecules have a globular shape and are preferably near-gelation polymers. A near-gelation polymer can be formed when the degree of interchain reaction, i.e., crosslinking, between the elastomeric molecules nears or approaches the gel point of the polymeric composition. At the gel point, a gel or insoluble polymer fraction forming in a polymeric composition first becomes observable.

Theoretically, a gel corresponds to an infinite network in which polymer molecules have been crosslinked to one another to form a macroscopic molecule. The gel may then be considered one molecule. A gel generally is insoluble in all solvents at elevated temperatures under conditions where polymer degradation does not occur; the non-gel portion of the polymer, often referred to as sol, remains soluble in solvents. For present purposes, near-gelation polymers also can be referred to as near-gel polymers.

When forming a near-gelation polymer, the gel point of the polymeric composition employed to create the near-gelation polymer preferably is determined. Several techniques are known in the art for estimating the gel point of polymeric compositions. Gel point can be determined experimentally by solvent extraction and other techniques described in P. J. Flory, Principles of Polymer Chemistry (1953), or approximated by using theoretical calculations as described in, for example, G. Odian, Principles of Polymerization, 3d ed., pp. 108–123, (1991). The polymeric composition employed to create the near-gelation polymer can be referred to as the prepolymer system.

Although gel point can be discussed in terms of a variety of parameters, determining the ratio of the weight of curative to the weight of prepolymer necessary to reach the gel point can be convenient. Thus, gel point can be represented by the weight of curative necessary to reach gelation, $W_{cg}$, over the weight of prepolymer, $W_p$. Likewise, the point of complete cure can be represented by the weight of curative necessary to reach complete cure, $W_{cc}$, divided by $W_p$. In general, therefore, the extent of any curing reaction can be represented by the weight of curative added, $W_c$, divided by $W_p$. For present purposes, extent of reaction, r, can be represented by $W_c$ over $W_p$. Therefore, the extent of gelation, $r_g$, is $r_g = W_{cg}/W_p$, and the extent of complete cure $r_{cc} = W_{cc}/W_p$.

Once the gel point of the prepolymer is determined, an appropriate amount of curative can be added and reacted with the prepolymer to achieve a near-gelation polymer. When selecting an appropriate amount of curative, the gel point preferably is approached but not exceeded, although the definition of near-gelation polymer broadly includes those reaction products of curative and prepolymer that exceed the gel point without actually reaching complete cure. Thus, the weight ratio employed to create a near-gelation polymer preferably is based on $E=|(r-r_g)/r_g|$ where E is the relative distance to the gel point while r and $r_g$ are defined as above. Since E is an absolute value, E is greater than or equal to 0 and less than or equal to about 0.5, more preferably less than about 0.2, still more preferably less than about 0.1, and even more preferably no more than about 0.05. The foregoing formula involves the absolute value of a number and, therefore, the extent of the reaction (r) is a relative distance (E) both beyond and before the gel point. For example, where the gel point of a particular polymeric composition is about 0.5 parts of curative per part of prepolymer, a near-gel polymer can be obtained by reacting the polymeric composition with about 0.3 or about 0.7 parts of curative per part of the prepolymer (thus, $E=|(0.3-0.5)/(0.5)|=0.4$ or $E=|(0.7-0.5)/(0.5)|=0.4$).

The prepolymer used in preparing the near-gelation polymer includes at least one functional group, preferably at least 2 functional groups, more preferably between 2 and about 10 functional groups, and even more preferably between 2 and about 5 functional groups. For present purposes, the prepolymer can be referred to as the functionalized prepolymer. The functional groups can be located at the terminal end of the prepolymer, including the initiated end of the polymer, or along the backbone of the prepolymer. Therefore, crosslinking can occur anywhere on the prepolymer chain.

The elastomeric composition is preferably manufactured by mixing and dynamically heat-treating the components described above, namely, by melt-mixing. As for the mixing equipment, any conventional, generally known equipment such as an open-type mixing roll, open-type Banbury mixer, closed-type Banbury mixer, closed-type Branbender mixer, extruding machine, kneader, or continuous mixer is acceptable. The closed-type Brabender mixer is preferably, and mixing in an inactive gas environment, such as nitrogen or argon, is preferable.

In summary, the molded polymers produced from the blend of the present centipede polymer and polyester retain elastomeric characteristics and are useful in high damping applications. The elastomeric composition contains between about 30–60 wt % centipede polymer, preferably between about 35–55%, and most preferably about 40–55 wt %. The composition preferably contains between about 5 and 40 wt % hyperbranched polyester, more preferably between about 10 and 40%, most preferably between about 15 and 40%. The composition also contains between about 5 and 40 wt % extender, more preferably between about 10 and 40%, and most preferably between about 15 and 40%.

Frequently, adding other known additives to the compositions can be desirable. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl) benzotriazole, nickel di-butyl-dithiocarbamate, zinc di-butyl-di-thiocarbamate, tris(nonylphenyl) phosphite, 2,6-di-t-butyl4-methylphenol, and the like. Exemplary conventional fillers and pigments include silica, carbon black, $TiO_2$, $Fe_2O_3$, and the like. These compounding ingredients are incorporated in suitable amounts depending upon the contemplated use of the product, preferably in the range of 1–350 parts of additives or compounding ingredients per 100 parts of the polymer composition.

A reinforcement may be defined as a material added to a resinous matrix to improve the strength of the polymer. Most reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability. Examples of other elastomers and resins include adhesive-like products including Reostomer™ (Riken-Vinyl, Inc., Tokyo, Japan), hydrogenated polystyrene-(medium or high 3,4) polyisoprene-polystyrene block copolymers such as Hybler™ (Kurary, Inc., Osaka, Japan), polynorbornenes such as Norsorex™ (Nippon Zeon, Inc., Tokyo, Japan), and the like. The foregoing materials are equally applicable to the instant centipede polymer compositions.

Damping is the absorption of mechanical energy by a material in contact with the source of that energy. Transmission of mechanical energy from, for example, a motor, engine, or power source to its surroundings desirably is damped or mitigated. Elastomeric materials often are used for this purpose. Such materials preferably are highly effective in converting this mechanical energy into heat rather than transmitting it to the surroundings. Even more preferably, this damping or conversion is effective over a wide range of temperatures and frequencies commonly found near motors, automobiles, trucks, trains, planes, and the like.

The compositions of the present invention are favorably used in the manufacturing of any product in which some of the following properties are advantageous: a degree of softness, heat resistance, decent mechanical properties, elasticity, and/or high damping. The compositions of the present invention can be used in many industry applications, in particular, in the fabrication of automotive parts, tire tread rubbers, household electrical appliances, industrial machinery, precision instruments, transport machinery, constructions, engineering, and medical instruments.

The composition of the present invention can be used in the fabrication of damping materials and vibration restraining materials. These uses involve connecting materials such as sealing materials, packing, gaskets, and grommets, supporting materials, such as mounts, holders, and insulators, and cushion materials, such as stoppers, cushions, and bumpers. These materials also can be used in equipment producing vibration or noise and household electrical appliances, such as in air-conditioners, laundry machines, refrigerators, electric fans, vacuums, dryers, printers, and ventilator fans. These materials also are suitable for impact absorbing materials in audio equipment and electronic or electrical equipment, sporting goods, and shoes.

The present invention will also be useful in any application where a superior high temperature compression set is desirable. With a compression set of less than 60% at 100° C., this composition can be used in a variety of high temperature applications. One example of this would be as coatings, especially for windows and car windshields which retain heat and cause polymers with lower service temperatures to melt.

In the following, the present invention will be described in more detail with reference to non-limiting examples. The following examples and tables are presented for purposes of illustration only and are not to be construed in a limiting sense.

EXAMPLES

Example 1
Preparation of Hyperbranched Polyester

A hyperbranched polyester was synthesized in a 1 liter glass kettle fitted with a Dean-Stark trap and magnetic stirring. 84.4 g ethylhexanoic acid, 41.1 g pentaerythritol, and 44.2 g phthalic anhydride (Aldrich, Milwaukee, Wis.) were mixed in the flask and heated. All materials melted and mixed at 220° C., and water, formed as a byproduct, was driven off as the temperature was raised to 260° C. When water evolution slowed, the mixture was heated to 280° C. under vacuum for 4 hours, followed by the addition of 1,2,4-benzene tricarboxylic anhydride (Aldrich, Milwaukee, Wis.). The reaction mixture was reheated to 280° C. for 2 hours under vacuum.

The product was a soft, elastomeric polymer. An Rheometry Dynamic Analysis temperature sweep showed a tan δ peak of 2.6 at 35° C. and a tan δ of 1.5–2.6 from 25–145° C.

Example 2
Preparation of Hyperbranched Polyester 54.5 g pentaerythritol, 57.7 g ethylhexanoic acid, 59.2 g phthalic anhydride, 12 g UMEX™ 110TS (SANYO Chemical, Osaka, Japan) (maleated i-polypropylene with acidity=7 mg KOH/g), and 1 g 1,2,4-benzene tricarboxylic anhydride were added to a 1 liter glass kettle fitted with a Dean-Stark trap and magnetic stirring. After 1 hour at 260° C., the evolution of water had slowed. Another 57.7 g ethylhexanoic acid was added and reaction continued 3 hours at 260° C. Reaction was continued for 8 additional hours at 260° C. under vacuum. A soft elastomeric polymer was formed.

Example 3
Preparation of the Polypropylene Grafted Centipede Polymer

To a 6 L kneader-extruder (MXE-6, Jaygo, Inc.) equipped with sigma blades was added 1.252 kg Isoban-10™, poly (maleic anhydride-alt-isobutylene) (Kurary Co., Osaka, Japan), and 0.989 kg octylamine (99%, BASF) at 54° C. Mixing was start ed with a blade speed of 25 rpm and screw speed of 40 rpm for 5 minutes, then the temperature of the mixer was adjusted to rise to 190° C. at a rate of about 3° C./minute. Mixing was further continued for 2 more hours isothermally at 190° C. Then, 0.562 kg (PO1015™, Exxon Chemical, Houston, Tex.) maleated polypropylene was added to the mixer. Mixing was continued for another 30 minutes, followed by the addition of 23 g dodecane diamine (98%, Aldrich, Milwaukee, Wis.). After 15 minutes, 1.397 kg DTDP oil was added and the temperature was adjusted to 160° C. After another 2 hours, the final product was then extruded through a ¼ inch (0.63 cm) die. The final product contained 33% DTDP oil and was a thermoreversible elastomer.

Example 4
Preparation of High Damping Gels

A charge of 35 g of the product of Example 3 was added to a Brabender mixer (~55 g capacity) equipped with a roller blade and $N_2$ purging. The mixer was initially set to 160° C. and 60 rpm.

After 3 minutes, a charge of 15 g of the product from Example 1 was added to the mixer. The material was further mixed at those conditions for 17 minutes; then, the agitation was turned off and the mixture was removed form the mixer.

Example 5
Preparation of High Damping Gels

The procedure from the first paragraph of Example 4 was repeated.

After 3 minutes, a charge of 10.5 g of the product from Example 2 and a charge of 4.5 g DTDP were added the mixer. The material was further mixed at those conditions for 27 minutes, then the agitation was turned off and the mixture was removed from the mixer.

Example 6
Preparation of High Damping Gels

The procedure of Example 4 was repeated except for a minor change in the charges of the materials and the total mixing time. In this example, 35 g of Example 3 and 15 g of Example 2 products were added to the mixer. The total mixing time was 45 minutes.

The products of examples 3–6 an were molded into sheets and cylinder buttons at ~160° C. Ring samples were cut from these sheets for tensile measurements. The details of the physical properties of the final materials are listed in Table 1.

TABLE 1

Physical Properties of Polymer Compositions

| Example No | Polyester Hyper-branch | Centi/ hyper/ oil | C.S. 100° C. 22 hrs | Tb kPa | Eb % | As-ker- C | Shore A | Tan δ 23° C. |
|---|---|---|---|---|---|---|---|---|
| 3 (comp) | None | 76/0/33 | 49.0% | 1847 | 217 | 30 | 13 | 0.60 |
| 4 | Ex. 1 | 47/30/23 | 48.6% | 1337 | 431 | 17 | 8 | 1.34 |
| 5 | Ex. 2 | 47/20/33 | 44.5% | 1041 | 366 | 17 | 8 | 0.95 |
| 6 | Ex. 2 | 47/30/23 | 47.0% | 1234 | 454 | 20 | 9 | 1.24 |

As can be seen in the table, the products were soft and thermo-reversible gels. These materials (examples 4–6) exhibited superior damping properties with good balanced tensile strength and thermo-stabilities. Finally, all materials shown in the table were thermally recyclable at 160° C. and have a service temperature up to 100° C.

Various modifications and alterations that do not depart from the scope and spirit of this invention will become apparent to those skilled in the art. This invention is not to be unduly limited to the illustrative embodiments shown herein.

We claim:

1. A method for forming an elastomeric composition comprising:
   A. forming a blend by combining
      i. a poly(alkenyl-co-maleimide) that is the reaction product of ingredients comprising a maleimide and at least one of:
         a. vinyl aromatic hydrocarbons,
         b. $R^1R^2$ethylenes, in which $R^1$ and $R^2$ independently are selected from hydrogen or substituted or unsubstituted $C_1$ to $C_{20}$ alkyl groups having from 1 to 40 carbon atoms, and
         c. alkyl vinyl ethers, wherein the alkyl group is linear or branched, substituted or unsubstituted, having from 1 to about 40 carbon atoms, and
      ii. a maleated polyalkylene;
      iii. a crosslinking agent;
   B. allowing said crosslinking agent to react with the poly(alkenyl-co-maleimide) and maleated polyalkylene to form a maleated polyalkylene grafted poly (alkenyl-co-maleimide); and
   C. combining the product of step B with a polyester to provide the elastomeric composition.

2. The method of claim 1 further including adding an extender to the elastomeric composition to form an extended elastomeric composition having a tan δ of at least 0.5.

3. The method of claim 2 wherein said extender is at least one of softening agents, plasticizers, tackifiers, oligomers, lubricants, petroleum hydrocarbons, silicone oil, aromatic oil, naphthenic oil, and paraffinic oil.

4. The method of claim 2 wherein step C includes mixing about 10 t % to about 90 wt % of said elastomeric composition with a total amount of about 90 wt % to about 10 wt % of said extender.

5. The method of claim 1 wherein said elastomeric composition comprises between 30–60 wt % poly(alkenyl-co-maleimide), 5–40 wt % hyperbranched polyester, and 5–40 wt % extender.

6. The method of claim 1 wherein said vinyl aromatic hydrocarbons are selected from one or more of styrene, α-methylstyrene, p-methylstyrene, 4-phenylstyrene, m-methylstyrene, o-methylstyrene, p-tert-butylstyrene, and dimethylstyrene.

7. The method of claim 1 wherein said $R^1$, and $R^2$ of said $R^1R^2$ethylene, and said alkyl groups of said alkyl vinyl ether independently are methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyoxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, oxtyloxyethyl, octyloxypropyl, octyloxybutyl, octyloxypentyl, octyloxyhexyl, octyloxyheptyl, octyloxyoctyl, oxtyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, or 2,5-dimethylhexyl.

8. The method of claim 1, wherein the alkylene contributed groups of said maleated polyalkylene are at least one of ethylene, and propylene.

9. The method of claim 1 wherein said poly(alkenyl-co-maleimide) is formed by reacting a poly(alkenyl-co-maleic anhydride) with a primary amine.

10. The method of claim 9 wherein said primary amine is at least one of alkyl amines, alkyl benzyl amines, alkyl phenyl amines, alkoxybenzyl amines, alkyl aminobenzoates, and alkoxy anliline, containing from 1 to about 50 carbon atoms in the alkyl and alkoxy substituents in the primary amine.

11. The method of claim 1 wherein said crosslinking agent includes a low molecular weight organic compound having 2 or more functional groups, at least one functional group being capable of reacting with an unreacted maleic anhydride monomer unit in the centipede polymer and at least one functional group being capable of reacting with the carboxylic acid groups in the maleated polyalkylene.

12. The method of claim 11 wherein said functional groups are one or more of primary amines, secondary amines, vinyl, alkynyl, carboxyl, formyl, hydroxyl.

13. The method of claim 11 wherein said crosslinking agent is a diamine.

14. The method of claim 13 wherein said diamine comprises an aliphatic or cycloaliphatic diamine corresponding to the general formula $R^3(NH_2)_2$, wherein $R^3$ represents one of the group consisting of $C_2$–$C_{20}$ aliphatic hydrocarbon groups, $C_4$–$C_{20}$ cycloaliphatic groups, and $C_4$–$C_{20}$ N-heterocyclic rings.

15. The method of claim 14 wherein said diamine one or more of ethylene diamine; 1,2-propylene diamine; 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2-diaminocyclohexane; 1,4-diaminocyclohexane; 1,2-diaminodecalin; 1,4-diaminodecalin; 1,5-diaminodecalin; 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane; 3,3',5,5'-tetramethyl-bis-(4-aminocyclohexyl)-propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; methylene-bis(o-chloroaniline); bis(3,4-diaminophenyl)sulfone; diaminodiphenylsulfone; 4-chloro-o-phenylenediamine; m-aminobenzylamine; m-phenylenediamine; 4,4'-$C_1$–$C_6$-dianiline; aniline-formaldehyde resin; trimethylene glycol di-p-aminobenzoate; bis-(2-aminoethyl)-amine; bis-(3-aminopropyl)-amine; bis-(4-aminobutyl) amine; bis-(6-aminohexyl)-amine; and isomeric mixtures of dipropylene triamine and dibutylene triamine.

16. The method of claim 1 wherein said polyester is a hyperbranched, near gelation polymer formed by reacting a polyester prepolymer and a crosslinking agent, said hyperbranched polymer having a physical state relative to the gelation point of a crosslinked polymer defined by $0 \leq |(r-r_g)/r_g| \leq 0.5$ where r is the weight ratio of said crosslinking agent to said polyester prepolymer and $r_g$ is the weight ratio of said crosslinking agent to said polyester prepolymer at the gelation point of the crosslinked polymer.

17. The method of claim 1 wherein steps A and B are carried out in the absence of solvent.

18. A composition comprising a copolymer, including a maleimide, and at least one monomer contributed unit chosen from the group consisting of vinyl aromatic hydrocarbons, $R^1R^2$ethylenes, and alkyl vinyl ethers, wherein said copolymer is grafted to at least one maleated polyalkylene and combined with least one hyperbranched polyester.

19. A polymer gel composition comprising:
   a. a polymer including maleimide and alkenyl units,
   b. a crosslinking agent,
   c. a maleated polyalkylene,
   d. a hyperbranched polyester, and
   e. optionally, an extender.

20. The composition of claim 19 wherein said alkenyl unit is at least one of vinyl aromatic hydrocarbons, $R^1R^2$ethylenes, and alkyl vinyl ethers.

* * * * *